April 30, 1963 J. W. CROWNOVER 3,088,100

DIODELESS MAGNETIC SHIFT REGISTER

Filed Oct. 1, 1958 3 Sheets-Sheet 1

INVENTOR:
Joseph W. Crownover

By Marvin H. Kleinberg
Attorney

April 30, 1963 J. W. CROWNOVER 3,088,100

DIODELESS MAGNETIC SHIFT REGISTER

Filed Oct. 1, 1958 3 Sheets-Sheet 2

INVENTOR:
Joseph W. Crownover

By Marvin H. Kleinberg
Attorney

INVENTOR:
Joseph W. Crownover
By Marvin H. Kleinberg
Attorney 3,088,100

DIODELESS MAGNETIC SHIFT REGISTER

Joseph W. Crownover, La Jolla, Calif., assignor, by mesne assignments, to Litton Systems, Inc., Beverly Hills, Calif., a corporation of Maryland Filed Oct. 1, 1958, Ser. No. 764,701
11 Claims. (Cl. 340—174)

This invention relates to shifting registers and more particularly to a diodeless magnetic core shifting register in which signal transfer pulses are simultaneously applied to more than one core per stage.

Magnetic cores, having rectangular hysteresis loops, have received wide acceptance in the data processing fields. Magnetic cores provide an inexpensive information storage element that is extremely reliable in operation. The state of magnetization of the individual cores represents stored information and no wearing or moving parts are required. The information is non-volatile and a loss of electrical or mechanical power does not result in a loss of stored information.

Since the introduction of the magnetic core, a great number of circuits have been devised utilizing these cores in information handling system applications. The vast majority of the shifting register circuits, especially those commerically available, have all utilized diodes to provide uni-directional coupling between individual cores. Those diodes are intended to prevent undesirable transfers of information into non-selected cores when information is transferred to a particular selected core.

Inclusion of a diode in the information transfer circuit immediately nullifies many of the advantages of the magnetic cores. In and of themselves, the diodes are costly, unreliable, and require additional space. Also, the diodes impose specific limitations on the impedance and signal levels which may operate the circuit. It would be preferable, therefore, to have a shifting register circuit that could operate without diodes or other rectifying elements.

A diodeless magnetic core shifting register circuit has been reported on by L. A. Russell, whose article, "Diodeless Magnetic Core Logical Circuits," appears at page 106 of part 4 of the 1957 IRE National Convention Record, published in 1957. Each stage of the described register has two cores per bit, and uses two separate pulse sources having non-identical operating periods. However, magnetic cores having a very sharp switching threshold and a square rather than rectangular hysteresis loop are necessary for successful operation of the Russell circuits. Further, Russell points out that his circuits are limited as to speed, and that the resistive elements intercoupling the various core stages must be carefully chosen to suit the particular operating speed desired.

Another diodeless shift register circuit has been shown by R. K. Richards at p. 219 of his book, "Digital Computer Components and Circuits," published in 1957, in which four cores per stage are used, two cores in complementary magnetic states representing a single binary digit. Still another diodeless register circuit is shown in the patent to T. J. Rey, Patent No. 2,683,819, issued July 13, 1954. Two cores are used for each bit of storage. Adjacent cores are interconnected by a choke having a magnetizable core upon which a bias is impressed. At low frequencies, therefore, the choke acts as a uni-directional transformer.

It would be desirable to having a magnetic core shifting register that is operable throughout a wide frequency range, avoids the use of diodes, and in which the squareness of the hysteresis loop and the sharpness of the switching threshold of the magnetic cores are not critical parameters of operation. Such a circuit would be useful in high speed storage applications, and yet would exhibit all of the advantages of magnetic core circuitry, such as long-lived passive elements, extremely reliable components, and compact packaging.

According to the present invention, a shifting register is constructed using three magnetic cores per stage, each stage storing a single bit of information. Each core of a stage is connected to a different source of clock pulses. Shift pulses, for propagating information, are applied sequentially to the cores and, at any time interval, at least two of the cores of each stage have pulses simultaneously applied thereto.

In a specific embodiment of the present invention, a pulse generator applies pulses through a suitable delay network which sequentially drives three shift circuits, each connected, respectively, to corresponding cores in each of a plurality of stages. A shift winding on each core is serially connected to an inhibit winding on a prior core and an assist winding on a succeeding core. The winding on the prior core inhibits the backward transfer of information through an information transfer circuit and the winding on the succeeding core aids the forward transfer of information through the transfer circuit. Therefore, in each pulse interval, an information transferring pulse is applied to two of the cores and a pulse tending to enter information is applied to a third of the cores.

A "one" if stored in the driven core will be transferred, aided by the assist winding, to the succeeding core. The winding on the prior core opposes any backward transfer of information. In the next stage, the core adjacent the transferee core is also inhibited, and therefore, is not driven by the transferee core. Consequently, three shift pulses are required to transfer a bit of information from stage to stage.

In a second specific embodiment, a source of clock pulses is connected to a delay network to drive each of the three cores of a stage, in sequence. Each pulse period can be divided into three equal intervals. During two of the intervals the pulse is "on" and during one of the intervals the pulse is "off." The delay network applies a train of pulses to each of the three cores, each train differing in phase by 120° from the others. As a result, pulses to the first cores are initiated during the pulse applied to the third cores. Half way through the first core pulse interval, the third core pulse terminates and a pulse to the second core is initiated. Half way through the interval of the second core pulse, the first pulse terminates and the third core is pulsed.

As before, a single bit of information is transferred into the first core during a third interval, transferred from first to second core during a first interval, and is transferred from the second to the third core during a second interval. At the third pulse, the bit is transferred to the first core of the next stage. As each successive timing pulse is applied to a core, the adjacent prior core is still being subjected to the prior pulse and, consequently, an attempted information transfer to the prior core is opposed.

It will be apparent to those skilled in the art that other bistable storage devices may be used in practicing the present invention. For example, open cores, ferrite plates, as well as non-magnetic elements such as ferroelectric units, presently utilizing diodes for inter-stage coupling may be adapted to operate in accordance with the present invention. The use of a three phase clock and the blocking of units adjacent the unit to receive the stored digit is generally applicable to a whole family of shifting registers.

Accordingly, it is an object of the present invention to provide a diodeless shifting register having three storage elements per bit in which all storage elements receive control signals during each signal transfer operation.

It is a further object of the invention to provide a diodeless shifting register using three storage elements per stage operated by a three phase, shifting pulse source and in which shifting pulses are applied to each element for ⅔ of each pulse period.

It is a still further object of the invention to provide a diodeless shifting register circuit using a three phase source of shifting pulses in which the shifting pulses are overlapped.

It is a still further object of the invention to provide a diodeless magnetic core shifting register in which three cores comprise a single register stage and in which each core has a shifting pulse applied thereto during a different portion of a timing interval.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

Figure 1:
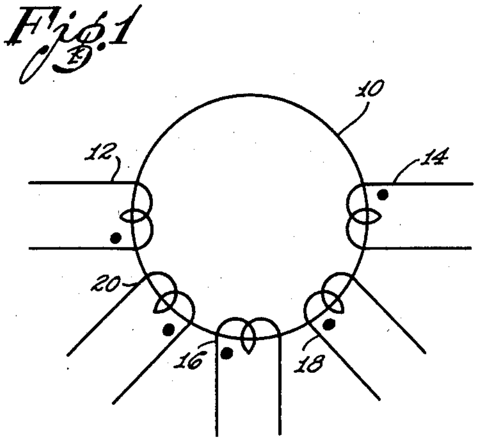
FIGURE 1 is a diagram of a single core and the windings associated therewith.

In the drawings the conventional "dot" notation has been used to indicate the sense of the windings on the cores, and the accepted conventions for information storage have been adopted. A core in a remanent state of positive magnetization is said to be storing a binary "1." A pulse tending to drive the core into a negative remanent state is applied as an information transfer or shifting pulse. If the core is in the positive state, then a shifting pulse drives the core into negative saturation, producing a large flux change which, if applied in the proper polarity to an adjacent core, drives the adjacent core to a positive or "1" state, thereby transferring the information. If a shift pulse is applied to a core already in the negative or "0" state, little or no flux change is produced.

In the "dot" notation, either a positive pulse applied to the dotted terminal of a winding or a negative pulse applied to the non-dotted terminal of a winding drives the core towards negative saturation. Similarly, either a negative pulse applied to the dotted terminal or a positive pulse applied to the non-dotted terminal of a winding drives the core towards positive saturation. Whenever a core switches its remanent state of magnetization, a pulse is induced in its windings.

If a positive pulse applied to a dotted terminal produces the change in flux, then a positive pulse is developed at the dotted terminals or a negative pulse is developed at the non-dotted terminals of all other windings of the core. Similarly, if a negative pulse at a dotted terminal causes the flux change, negative pulses are produced at the dotted terminals or positive pulses are produced at the non-dotted terminals.

In FIGURE 1, a typical core 10 is shown with its windings. A plurality of such cores 10, suitably interconnected, comprises a shifting register. Each core 10 has an input winding 12, an output winding 14, an information transfer or shift winding 16, an inhibit winding 18, and an assist winding 20. For ease in describing a register, the reference numerals applicable to the elements of a first core of a stage are primed, and similarly, the same parts of the second and third cores of the stage are distinguished by double and triple primes, respectively.

Figure 2:
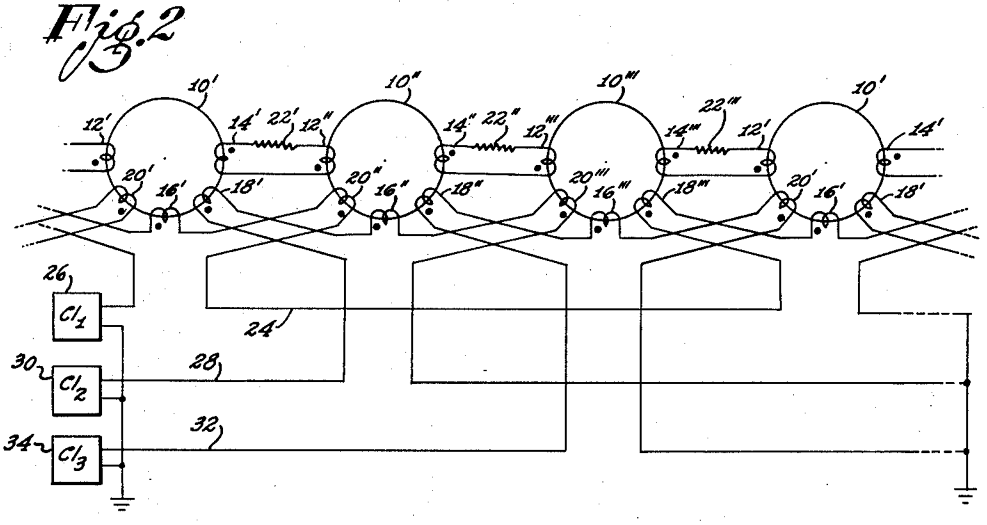
FIGURE 2 is a diagram of a diodeless shifting register in which each shift pulse is simultaneously applied to an interconnected plurality of the cores of FIGURE 1.

A portion of a diodeless magnetic core shifting register is illustrated in FIGURE 2 in which four magnetic cores 10 are shown. Three cores 10′, 10″, 10‴, comprise one stage of the register. The fourth core 10′, is a first core of a next stage.

A symmetrically conductive signal transfer loop 22′ couples the output winding 14′ of a first core 10′ to the input winding 12″ of the adjacent second core 10″. A first shift circuit 24 is connected to a first source of clock pulses 26 and, in each stage, serially interconnects the shift winding 16′ of the first core 10′ of the stage with the assist winding 20″ of the second core 10″ and the inhibit winding 18‴ of the third core 10‴. Each clock pulse source provides a positive pulse during ⅓ of a pulse period and is open circuited during the remaining ⅔ of a period.

In the adjacent prior and subsequent stages, the connection pattern is repeated. In a multiple stage register, the first shift circuit 24 serially interconnects all of the shift windings 16′ of all first cores 10′, with the assist windings 20″ of all second cores 10″, and the inhibit windings 18‴ of all third cores 10‴. A second shift circuit 28 is coupled to a second source of clock pulses 30 and serially interconnects the shift windings 16″ of the second cores 10″ with the assist windings 20‴ of the third cores 10‴ and the inhibit windings 18′ of the first cores 10′. A third shift circuit 32 connects shift windings 16‴ of the third cores 10‴ to assist windings 20′ of the first cores 10′ and inhibit windings 18″ of the second cores 10″ and is coupled to a third source of clock pulses 34.

Three separate clock pulses $Cl_1$, $Cl_2$, and $Cl_3$, are respectively applied from different sources 26, 30, 34 to the first, second, and third shift circuits 24, 28, 32 in sequence, so that only one of the circuits has a pulse applied thereto at any time.

A binary "one," transferred to the first core 10′ of a stage at $Cl_3$, is transferred to the second core 10″ at $Cl_1$, to the third core 10‴ at $Cl_2$ and to the first core 10′ of the next stage at $Cl_3$. All of the first cores 10′ in the register simultaneously transfer their contents to the adjacent second cores 10″ at the occurrence of $Cl_1$ and similarly, the second and third cores 10″, 10‴ transfer their contents during $Cl_2$ and $Cl_3$, respectively. It may be seen that three clock pulses are needed to transfer an information bit from stage to stage.

In order to assure a definite transfer of information from core to core, for example from a second core 10″ to a third core 10‴ of a stage, it is necessary that the total ampere-turns supplied to the third core 10‴ should at least be sufficient to switch the core into a magnetic state of positive saturation. To keep "noise" at a minimum and to prevent frequent excursions of "assisted" cores when shifting pulses are applied to prior adjacent cores, the assist winding 20‴ should have fewer turns than the shift winding 16″. Further, the turns ratio of the input winding 12‴ to the output winding 14″ of a transfer loop 22″ may be 1:1 if the assist winding 20‴ applies sufficient ampere turns from the shift circuit 28 to compensate for losses in the transfer loop 22″ and in the cores 10″, 10‴. The inhibit winding 18′, however, must supply ampere-turns sufficient to drive the inhibited core 10′ to saturation in order to prevent any backward transfer of flux through the output winding 14′ of the inhibited core. This can best be accomplished by a suitable choice of turns in the inhibit winding 18′ relative to the turns in the transfer loop 22′ and in the shift winding 16″ of the driven core 10″. Obviously, all similar windings have the same number of turns.

Figure 3:
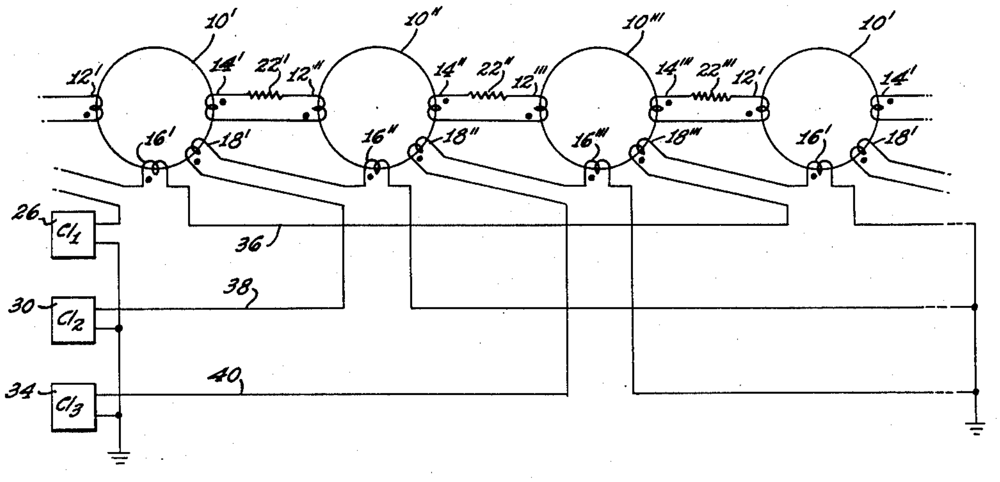
FIGURE 3 is a diagram of another embodiment of diodeless shifting registers in which each shifting pulse is simultaneously applied to drive one core and inhibit a second core in each stage.

Another specific embodiment of a diodeless shift register is illustrated in FIGURE 3. As in the arrangement of FIGURE 2, reference numerals pertaining to the first core of each stage have been primed, reference numerals pertaining to the second core have been doubled primed, and reference numerals designating elements of the third core of the stage have been tripled primed. The shift register of FIGURE 3 differs from the register of FIGURE 2 in that each shift circuit includes only shift windings and inhibit windings. The first source of clock pulses 26 is connected to a first shift circuit 38 which is coupled to the shift windings 16′ of the first cores 10′ and to the inhibit windings 18‴ of the third cores 10‴. The second source 30 is connected to a second shifting circuit 38 which couples the inhibit windings 18′ of first cores to the shift winding 16″ of second cores 10″. The third pulse source 34 is connected to a third shifting circuit 40 which couples the inhibit windings 18″ of second cores 10″ to the shift windings 16‴ of third cores 10‴. The transfer loops 22′, 22″, and 22‴ are substantially identical to those of the register of FIGURE 2.

In operation, the register of FIGURE 2 functions much in the same fashion as the register of FIGURE 1. If a binary "0" is set into a first core 10, then on the occurrence of a first pulse $C_{11}$, the shift winding 16′ receives an impulse which drives the first core 10′ further into negative saturation. At the same time, the first shifting circuit applies a pulse to the inhibit windings 18‴ of the third cores 10‴ of the prior stages and of the same stage, holding the third cores 10‴ in negative saturation. Application of $Cl_2$ to the second shifting circuit 38 results in substantially similar behavior as does the application of $Cl_3$ to the third shifting circuit 40.

If now a "1" is shifted into the first core 10′ of a stage, that core 10′ is driven to a state of positive saturation and remains in a positive remanent state. The application of $Cl_1$ on shifting circuit 36 drives the core 10′ to a negatively saturated state causing a large flux change in the process. The large change of flux induces positive pulses at the dotted terminals of the input winding 12′, the output winding 14′, and the inhibit winding 18′. However, at the occurrence of $Cl_1$, the second pulse source 30 and the third pulse source 34 are both open circuited, being in their "off" or non-pulse providing states, and therefore the inhibit winding 18′ is part of an open circuit. The signal transfer loop 22′ applies a positive signal to the undotted terminal of the input winding 12″ of the second core 10″ sufficient to switch the core 10″ from a negative state to a saturated positive state. It may be noted that at $Cl_2$ and $Cl_3$, the second core 10″ is driven into the negative remanent state.

The flux change in the second core 10″ develops a positive pulse at the undotted terminals of the output winding 14″, the inhibit winding 18″, and the shift winding 16″. Both of the latter two windings are parts of open circuits as pointed out above. In the output winding 14″, however, a positive pulse generated at the non-dotted terminal is applied through the transfer loop 22″ into the dotted terminal of the input winding 12‴ of the third core 10‴ tending to drive the third core 10‴ into negative saturation. At the same time, the shift pulse $Cl_1$, is applied to the inhibit winding 18‴ of the third core 10‴, also tending to drive it into negative saturation. At $Cl_3$, the third core 10‴ was driven into the negative state as a result, the state of the third core 10‴ is not affected at this time.

Application of $Cl_2$ by the second clock circuit 30 to the second shifting circuit 38 transfers, in a similar fashion, the stored "one" from the second core 10″ into the third core 10‴. $Cl_3$, applied to the third shifting circuit 40 transfers the "one" now stored in the third core 10‴ into the first core 10′ of the next stage of the register. At any time, at least two cores of each stage are in a negative remanent state representing the storage of "zeroes." If a "one" is in the stage, only one of the cores can store it.

Figure 4:
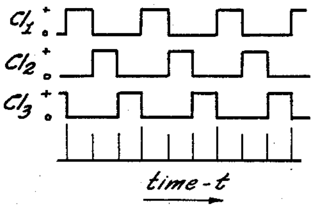
FIGURE 4 is a timing diagram of shifting pulses applied to the registers of FIGURE 2 and FIGURE 3.

In the timing diagram of FIGURE 4, a first abscissa is used to illustrate the waveform of the train of pulses, $Cl_1$, coming from the first pulse source 26. In second and third abscissas, similar waveforms are set out for the pulse train outputs of the second source 30, $Cl_2$, and third source 34, $Cl_3$. A time reference scale is set out beneath the three waveforms and the three abscissas share common ordinates, designating the time division of a phase $Cl_2$ is "on" and $Cl_1$ and $Cl_3$ are "off," and during $Cl_1$ is "on" and $Cl_2$ and $Cl_3$ are "off," during a second phase $Cl_2$ is "on" and $Cl_1$ and $Cl_3$ are "off," and during phase three, $Cl_3$ is "on," and $Cl_1$ and $Cl_2$ are "off."

Figure 5:
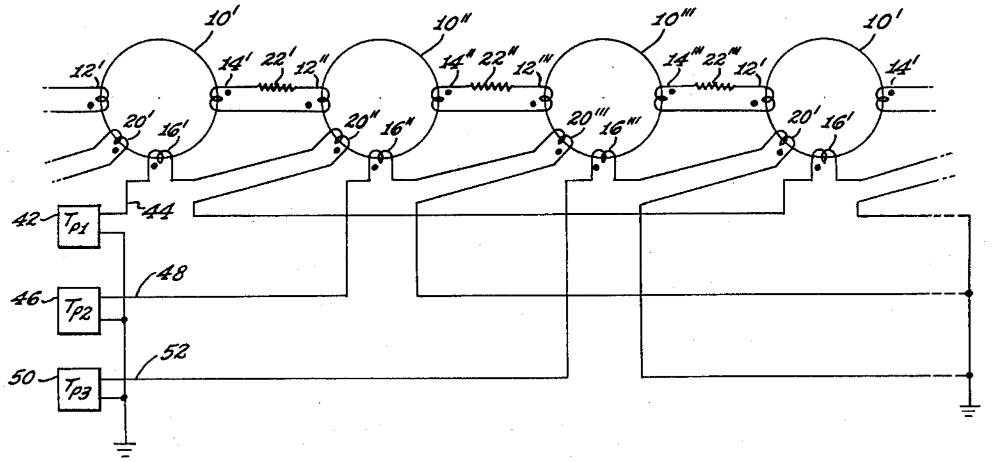
FIGURE 5 is a diagram of another diodeless shifting register in which each shifting pulse is applied to drive one core and assist a second core of a stage.

A different embodiment of a diodeless shifting register is illustrated in FIGURE 5. As in the prior circuits, the elements associated with the first core are primed, with the second core are doubled primed, and with the third core are tripled primed. A first timing pulse source 42 is connected to a first shifting circuit 44 and is further connected to the dotted terminal of the shift winding 16′ of the first core 10′ and to the undotted terminal of the assist winding 20″ of a second core 10″. The second timing pulse source 46 is similarly connected through the second shifting circuit 48 to the dotted terminal of the shift winding 16″ of the second core 10″ and to the undotted terminal of the assist windings 20‴ of the third cores 10‴. The third timing pulse source 50 is connected through the third shifting circuit 52 to the dotted terminal of the shaft winding 16‴ of the third core 10‴ and to the undotted terminal of the assist winding 20′ of the first core 10′.

Figure 6:
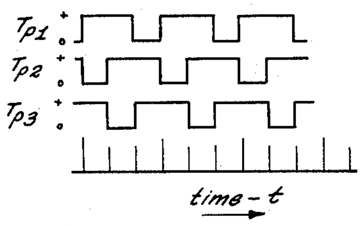
FIGURE 6 is a timing diagram of shifting pulses applied to the register of FIGURE 5.

Turning now to FIGURE 6, a timing diagram is set forth of the timing pulse trains $T_{p1}$, $T_{p2}$, and $T_{p3}$ provided by the first, second, and third timing pulse sources 42, 46, 50, respectively. The timing diagram is arranged in the same fashion as the diagram of FIGURE 4, the three abscissas sharing common ordinates. As may be observed from the waveforms, the duty cycles of each of the timing pulse trains $T_{p1}$, $T_{p2}$, and $T_{p3}$ is such that the pulses are "on" for ⅔ of a pulse period and "off" for ⅓ of a pulse period. Further, $T_{p2}$ goes "on" while $T_{p1}$ is "on," at which time, $T_{p3}$ is turned "off." $T_{p3}$ is turned "on" midway through $T_{p2}$ and, at the same time, $T_{p1}$ is turned "off." $T_{p1}$ is turned "on" as $T_{p2}$ is turned "off," midway in the interval of $T_{p3}$. As with the circuits described above, the pulse sources are open circuited when in the "off" condition and provide positive pulses when in the "on" condition.

In operation, and with reference to FIGURES 5 and 6, let it be assumed, for example, that a binary "0" is stored in the first core 10′ of a stage. At $T_{p1}$, a positive pulse is applied through the first shifting circuit 44 to the shift winding 16′ of the first core 10′ and to the assist winding 20″ of the second core 10″. Application of $T_{p1}$ to the first core 10′ results in no flux change as the core is already in a negative remanent state. Consequently, pulses are not produced at the input winding 12′ or the output winding 14′. The assist winding 20″ induces a slight change of flux in the second core 10″, but not enough to switch the remanent state of the core 10″. A slight voltage pulse is thereby induced in the output winding 14″ of the second core but, when applied to the third core 10‴, is in a direction tending to drive the third core 10‴ towards negative saturation. Simultaneously, however, $T_{p3}$ is applied to the shift winding 16‴ of the third core 10‴ which has already driven the core 10‴ into negative saturation. Application of $T_{p2}$ to the second shifting circuit 48 propagates, in similar fashion, the stored "0" from the second core 10″ to the third core 10‴. $T_{p3}$ in the third shifting circuit 52 transfers the "0" to the first core 10′ of the next stage.

To continue the example, assume that a "1" is now stored in the first core 10′ of a stage. That core 10′ is then in a positive state of magnetic remanence. Upon the application of $T_{p1}$ to the first shifting circuit 44, a positive pulse is applied to the dotted terminal of the shift winding 16′ and to the undotted terminal of the assist winding 20″ of the adjacent core 10″. The first core 10′ is driven into a saturated negative state, causing a large flux change in the core. A large positive pulse is induced in the dotted terminal of the output winding 14′, which is applied through the information transfer loop 22′ to the non-dotted terminal of the input winding 12″ of the second core 10″.

A large positive pulse is also induced at the dotted terminal of the input winding 12′ of the first core 10′ and is applied through transfer winding 22‴ to the non-dotted terminal of the output winding 14‴ of the third core 10‴ of the prior stage. The combined ampere turns contributed by the input winding 12″ and the assist winding 20″ are sufficient to switch the second core 10″ to a state of positive saturation, generating a large change of flux in the second core.

A large negative pulse is generated at the dotted terminal of the output winding 14″ which is applied through the transfer loop 22″, to the non-dotted terminal of the input winding 12‴ of the third core 10‴. As explained above, a negative pulse applied to a non-dotted terminal has the same effect as a positive pulse applied to a dotted terminal, which, in this case, tends to drive the third core 10‴ towards a negative saturated state. At the same time, however, $T_{p3}$ is still being applied to the third core 10‴, holding it in negative saturation. The maintenance of the third core 10‴ in a state of negative saturation, also prevents a flux change in the positive direction due to the attempted transfer of a pulse through the information transfer winding 22‴ when the first core 10′ changes from a positive to a negative state.

Application of $T_{p2}$ to the second shifting circuit 48 transfers the stored "1" in the second core 10″ to the third core 10‴, and application of $T_{p3}$ to the third shifting circuit 52 similarly transfers the stored "1" to the first core 10′ of the succeeding stage. The overlap of the timing pulses inhibits any backward transfer of information.

Figure 7:
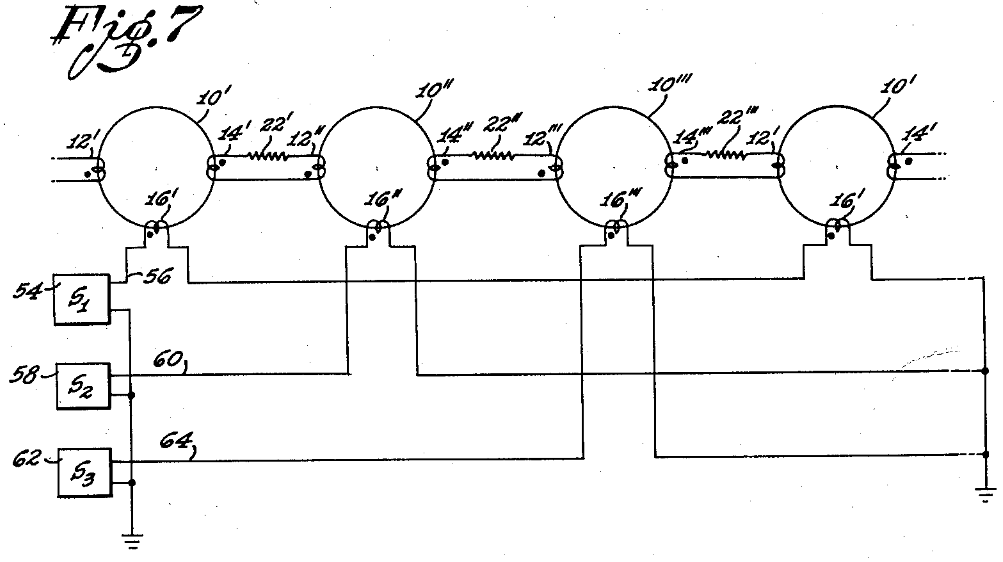
FIGURE 7 is a diagram of another alternative diodeless shifting register in which each shifting pulse is applied to a single core in each stage.

Still another specific embodiment of a diodeless shifting register according to the present invention is illustrated in FIGURE 7. A first source of shifting pulses 54 applies a shifting pulse $S_1$ to a first shifting circuit 56 which is connected to the dotted terminal of shift winding 16′ of the first cores 10′ of the register. A second source of shifting pulses 58 applies pulses $S_2$ to a second shifting circuit 60 which is connected to the dotted terminal of the shift winding 16″ of the second core 10″ of the register. A third source of shifting pulses 62 applies pulses $S_3$ to a third shifting circuit 64 which is connected to the dotted input terminals of the shift windings 16″ of the third core 10‴.

A timing diagram in FIGURE 7, plots waveforms for each of the pulse trains $S_1$, $S_2$, and $S_3$ on a separate abscissa against a common time ordinate. Each pulse period is divided into three phases, during two of which a pulse is "on" at a relatively positive potential. During the third phase of each period, the pulse if "off," at a relatively negative potential. In one specific embodiment, the negative excusion from the common reference level of the "off" pulses of the $S_1$ train is approximately one-half the amplitude of the positive excursion from the common level, which signifies the "on" condition.

Figure 8:
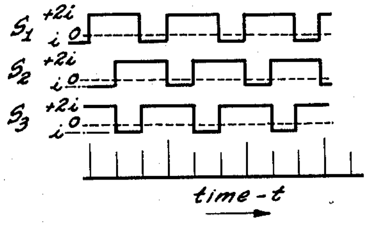
FIGURE 8 is a timing diagram of shifting pulses suitable for operating the register of FIGURE 7.

With reference now, both to FIGURES 7 and 8, at the application of an $S_1$ pulse to the first shifting circuit 56, a positive pulse is applied to the dotted terminal of the shift winding 16′ of the first cores 10′. At the same time, a negative pulse is applied to the dotted terminal of the shift winding 16″ of the second cores 10″ by the second shifting circuit 60. The shift windings 16‴ of the third cores 10‴ have a positive pulse, $S_3$, applied thereto, carrying over from the prior period. If a "0" is stored in the first core 10′ at this time, no flux change takes place in any of the cores.

If, however, a "1" is stored in the first core 10′, the pulse $S_1$ switches the first core to a saturated negative state, inducing a large positive pulse in the dotted terminals of the input winding 12′ and the output winding 14′. The information transfer circuit 22′ applies the positive pulse to the non-dotted terminal of the input winding 12″. Simultaneously, the second source of shifting pulses 58 applies a negative pulse through the second shifting circuit 60 to the dotted terminal of the shift winding 16″ of the second core 10″. The cumulative effect of both of these pulses drives the second core 10″ into a state of positive saturation. A positive pulse is also applied through transfer circuit 22‴ to the non-dotted terminal of the output winding 14‴ of the third core 10‴. The presence of a positive pulse in the third shifting circuit 64 extending from $S_3$, prevents any information transfers into the already negatively saturated third cores 10‴.

At the occurrence of $S_2$, the "1" stored in the second core 10″ is transferred into the third core 10‴ in much the same fashion. Similarly, on $S_3$, the "1" is shifted into a first core 10′ of a succeeding stage.

As with the other embodiments, only one core per stage stores a "1" during any time interval and three intervals are needed to transfer a stored bit from one stage to a succeeding stage. Two alternative forms of pulse generating systems suitable for providing shifting pulses to the above described registers are disclosed in FIGURES 8 and 9, respectively. FIGURE 8 is a block diagram of one form of a pulse generating system in which a pulse generator 70 is adjusted to provide a train of positive pulses, at a 33⅓% duty cycle. The pulse generator 70 may be an electrical or mechanical vibrator circuit, for instance, which is open circuited during the "off" periods and provides a positive pulse during the "on" period. Each pulse is on for ⅓ of a pulse period and is off for ⅔ of a pulse period. The output of the pulse generator 70 is applied to a first delay 72, the output of which is applied to the input of a second delay 74. Three signal outputs are taken from the combination. An output directly from the pulse generator 70, provides a first signal, the output of the first delay 72 provides a second signal, and the output of the second delay 74 provides a third signal. Each of the delays 72, 74 introduces a time lag equivalent to the duration of a single "on" pulse. It may then be readily seen that the outputs providing the first, second, and third signals will correspond to waveforms $Cl_1$, $Cl_2$, and $Cl_3$ in FIGURE 3.

It is well within the skill of the art to rearrange the circuits of the pulse generator 70 to generate a positive pulse during ⅔ of each pulse period and be open circuited during the remaining ⅓ of a period, operating at a 66⅔% duty cycle. In such an event, the three signal outputs correspond to the waveforms $T_{p1}$, $T_{p2}$, and $T_{p3}$ of FIGURE 5. It is equally feasible that, rather than being open circuited during the "off" state, the pulse generator 70 provides a negative pulse during ⅓ of the period to represent the "off" condition. In such a case, the outputs correspond to $S_1$, $S_2$, and $S_3$ of FIGURE 7.

Figure 9:
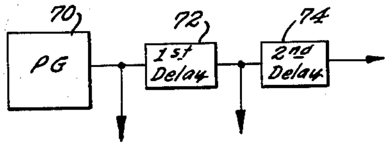
FIGURE 9 is a block diagram of a pulse generating arrangement suitable for providing pulses to the shifting register circuits of the present invention.
Figure 10:
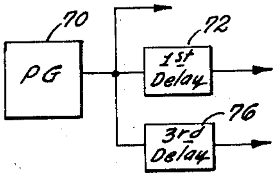
FIGURE 10 is a block diagram of an alternative timing pulse generating circuit.

In the alternative arrangement of FIGURE 9, the pulse generator 70 of FIGURE 8 provides a first output signal. The pulse generator output is then simultaneously applied to a first delay 72, similar to that of FIGURE 8 and to the input of a third delay 76. Second and third output signals are provided from the outputs of the first delay 72, respectively, and the third delay 76, respectively. The third delay 76 introduces a lag equivalent to twice that introduced by the first delay 72. As above, the three outputs of the pulse generating circuits of FIGURE 9 correspond to the waveform of FIGURE 3. After suitable adjustment of the output of the pulse generator 70, the duty cycle can be changed to 66⅔% to correspond to the waveform of FIGURE 5, and by introduction of a negative bias during the "off" portion of each period, the outputs correspond to the waveform of FIGURE 7.

Thus, there have been shown several magnetic core shifting register circuits in which diodes are not used for intercoupling of adjacent cores in a stage or between adjacent stages. A combination of three sources of timing pulses and windings applied to one or more cores per stage, together with the selected phasing and duration of individual timing pulses, permits the unidirectional transfer of information from core to core within each stage and enables the shifting of signals representing information from stage to stage in the register.

What is claimed as new is:

1. A diodeless shifting register comprising: a serially interconnected plurality of stages, each stage of which includes a first, second, and third magnetic storage element, each storage element having two remanent states; first shifting means for biasing said first and second storage elements of each stage towards respectively opposite remanent states, second shifting means for biasing said second and third storage elements of each stage towards respectively opposite remanent states; third shifting means for biasing said third and first storage elements of each stage towards respectively opposite remanent states; symmetrically conductive means intercoupling adjacent storage elements; and means for sequentially energizing said first, second, and third shifting means during successive time intervals to propagate information signals represented by the remanent state of a storage element from a first element to a second element to a third element in successive time intervals, and from stage to stage after every third time interval.

2. A shifting register circuit comprising: a source of timed bilevel pulses; a plurality of magnetic storage elements, each having two respectively opposite remanent states; symmetrically conducting means for serially interconnecting all of said storage elements for transferring signals representing information therebetween; input means for applying a signal to be stored to a first one of said storage elements; signal transfer means connected to each of said storage devices and responsive to a source of timed pulses for entering an applied signal to be stored into said first element at a first time interval $T_1$, for transferring a stored signal from said first element to a said second element at a subsequent second time interval $T_2$, and for transferring said signal from said second element to said third element at a subsequent third time interval $T_3$, said signal transfer means including means responsive to said source of timed pulses for applying a first level signal to said first element during times $T_3$ and $T_1$, to said second element during times $T_1$ and $T_2$, and to said third element during times $T_2$ and $T_3$, each of said storage elements receiving first level signals during two of three successive time intervals.

3. A diodeless shifting register comprising: a serially interconnected plurality of stages, each stage of which includes a first, second, and third magnetic storage element, each of which having two remanent states; first shifting means for biasing said first and second storage elements of each stage towards respectively opposite remanent states and for biasing said first and third elements to the same remanent state, second shifting means for biasing said second and third storage elements of each stage towards respectively opposite remanent states and for biasing said first and second elements to the same remanent state; third shifting means for biasing said third and first storage elements of each stage towards respectively opposite remanent states and for biasing said second and third elements to the same remanent state; symmetrically conductive means serially intercoupling adjacent storage elements; and means for sequentially energizing said first, second, and third shifting means during successive time intervals with bilevel shifting signals providing a first level signal in a first interval and providing a second level signal during two successive subsequent time intervals whereby information signals represented by the remanent state of a storage element are propagated from a first element to a second element to a second element to a third element in successive time intervals, and from stage to stage after every third time interval.

4. A diodeless shifting register comprising: a serially interconnected plurality of stages, each stage of which includes a first, second, and third magnetic storage element, each of which having two remanent states; first shifting means responsive to shifting signals of a first level for biasing said first and second storage elements of each stage towards respectively opposite remanent states during a first time interval, second shifting means responsive to shifting signals of a first level for biasing said second and third storage elements of each stage towards respectively opposite remanent states during a next time interval; third shifting means responsive to shifting signals of a first level for biasing said third and first storage elements of each stage towards respectively opposite remanent states during a third time interval; symmetrically conductive means serially intercoupling adjacent storage elements; and means for sequentially applying first level shifting signals for two successive intervals to said first, second, and third shifting means during successive time intervals and for applying second level shifting signals to said shifting circuits for the intervals following application of each first shifting signal whereby information signals represented by the remanent state of a storage element are propagated from a first element to a second element in a first time interval, from a second element to a third element in a next time interval, and from a third element of one stage to a first element of a succeeding stage every third time interval.

5. A shifting register circuit for storing bivalued information signals representing information comprising: a plurality of bistable magnetic storage devices; a plurality of symmetrically conductive signal transfer means serially connecting each of said storage devices with a next adjacent storage device; a first signal advancing means for simultaneously applying a first timing signal to a first storage device of every stage; a second signal advancing means for simultaneously applying a second timing signal to a second storage device of every stage; a third signal advancing means for simultaneously applying a third timing signal to a third storage device of every stage; a source of timing pulses for cyclically applying said first, second, and third timing signals successively to said first, second, and third signal advancing means, respectively, said first signal advancing means including means responsive to said first timing signals for applying an inhibiting bias to all of said third devices and an assisting bias to all of said second devices, said second signal advancing means including means responsive to said second timing signals for applying an inhibiting bias to first devices and an assisting bias to all of said third devices, said third signal advancing means including means responsive to said third timing signals for applying an inhibiting bias to all of said second devices and an assisting bias to all of said first devices.

6. A diodeless magnetic shifting register comprising: a plurality of serially interconnected stages, each stage of wihch includes first, second, and third magnetic storage elements, each element having two remanent states; a first shifting circuit connecting said first storage elements to a first source of shifting pulses; a second shifting circuit connecting said second storage elements to a second source of shifting pulses; a third shifting circuit connecting said third storage elements to a third source of shifting pulses; input means for applying signals representing information to said first elements; a plurality of symmetrically conductive means connecting first elements to second elements and second elements to third elements; output means for transmitting signals representing information from said third elements to first elements of adjacent stages; synchronizing means for controlling said first, second, and third sources of shifting pulses to provide to said first source a first level shift signal during a first ⅓ of a period and a second level signal during the remaining ⅔ of a period, said synchronizing means phasing the output of the second source to lag the first source output by 120°, and to phase the output of the third source to lead the first source output by 120°.

7. A diodeless magnetic shifting register including a plurality of serially interconnected stages, each stage of which comprises: first, second, and third magnetic storage elements, each having two respectively opposite remanent states; a first shifting circuit connecting said first storage elements to a first source of shifting pulses; a second shifting circuit connecting said second storage elements to a second source of shifting pulses; a third shifting circuit connecting said third storage elements to a third source of shifting pulses; input means for applying signals representing information to said first element; a plurality of symmetrically conductive means for connecting first elements to second elements and said second elements to said third elements within each stage; output means for transmitting signals representing information from said third element to a first element of an adjacent state; synchronizing means for controlling said first, second, and third sources of shifting pulses to provide a first level shift signal during a first ⅓ of a period and a second level signal during the remaining ⅔ of a period, said synchronizing means phasing the output of the second source to lag the first source output by 120°, and to phase the output of the third source to lead the first source output by 120°, said first shifting circuit including means to apply inhibiting signals to first elements, and said third shifting circuit including means to apply inhibiting signals to said second elements.

8. A diodeless magnetic shifting register comprising: a plurality of serially interconnected stages, each stage of which includes: first, second, and third magnetic storage elements, each of said elements having a first and a second remanent state respectively representing storage of binary "0" and "1," signals; a first shifting circuit connecting a first source of bilevel shifting pulses to said first storage elements; a second shifting circuit connecting a second source of bilevel shifting pulses to said second storage elements; a third shifting circuit connecting a third source of bilevel shifting pulses to said third storage elements; symmetrically conductive means serially connecting all of said elements; input means for applying signals representing information to a first element; output means for transmitting signals representing information from a third element; synchronizing means for controlling said first, second, and third sources of shifting pulses to provide a first level shift signal during a first ⅔ of a period and a second level signal during the remaining ⅓ of a period to said first source, said synchronizing means including means for phasing the output of the second source to lag the first source output by 120°, and to phase the output of the third source to lead the first source output by 120°; said first level signals biasing said elements to said first remanent state, and said second level signals biasing said elements to said second remanent state.

9. A shifting register including a plurality of serially connected stages operative in response to applied advancing signals for transferring bivalued signals representing information between stages comprising: a plurality of serially connected magnetic cores having two remanent states arranged in stages, each stage including three of said cores; each core having an input winding, an output winding, a shift winding, an inhibit winding, and an assist winding; a plurality of symmetrically conductive signal transfer means, each coupling the output winding of a core to the input winding of a next adjacent core for transferring stored information signals from core to core; a source of advancing signals; a first advancing circuit serially connecting said source of advancing signals with the shift windings of first cores of all stages, the assist windings of second cores of all stages, and the inhibit windings of third cores of all stages; a second advancing circuit serially connecting said source of advancing signals with the shift windings of second cores of all stages, the assist windings of third cores of all stages, and the inhibit windings of first cores of all stages; a third advancing circuit serially connecting said source of advancing pulses with the shift windings of the third cores of all stages, the assist windings of the first cores of all stages, and the inhibit windings of the second cores of all stages; means for cyclically applying advancing signals to said advancing circuits during successive intervals, said advancing signal having a first value for one time interval and having a second value for two subsequent time intervals, said last named means including means for applying said first valued signal to said first advancing circuit during a first interval, to said second advancing circuit during a second interval, and to said third advancing circuit during a third interval.

10. A shifting register including a plurality of serially connected stages operative in response to applied advancing signals for transferring bivalued signals representing information between stages comprising: a plurality of serially connected magnetic cores having two remanent states arranged in stages, each stage including three of said cores; each core having an input winding, an output winding, a shift winding, and an assist winding; a plurality of symmetrically conductive signal transfer means, each coupling the output winding of a core to the input winding of a next adjacent core for transferring stored information signals from core to core; a source of advancing signals; a first advancing circuit serially connecting said source of advancing signals with the shift windings of first cores of all stages and the assist windings of second cores of all stages; a second advancing circuit serially connecting said source of advancing signals with the shift windings of second cores of all stages, and the assist windings of third cores of all stages; a third advancing circuit serially connecting said source of advancing pulses with shift windings of the third cores of all stages and the assist windings of the first cores of all stages; means for cyclically applying advancing signals to said advancing circuits during successive intervals, said advancing signal having a first value for one time interval and having a second value for two subsequent time intervals, said last named means including means for applying said first valued signal to said first advancing circuit during a first interval, to said second advancing circuit during a second interval and to said third advancing circuit during a third interval.

11. A diodeless magnetic core shifting register comprising: a plurality of serially interconnected stages, each stage including a first, second, and third magnetic core, each core having two remanent states; a first symmetrically conductive means inductively coupling said first and second cores for transferring signals representing information therebetween, a second symmetrically conductive means inductively coupling said second and third cores for transferring signals representing information therebetween; input means for applying signals to said first core; output means to transfer information from said third core to a subsequent stage; shifting pulse source means connected to said cores for sequentially applying shifting pulses to said first, second, and third cores, said source means including means for applying signals of a first polarity to drive said first core toward a one of said two remanent states during a first third of a cycle, to drive said second core toward a one of said two remanent states during a second third of a cycle, and to drive said third core toward a one of said two remanent states during a final third of a cycle; means to hold said first core in said one remanent state when driving said second core, means to hold said second core in said one remanent state when driving said third core, and means to hold said third core in said one remanent state when driving said first core; and further means to apply to said second core an aiding bias toward the other of said two remanent states when driving said first core, means to apply to said third core an aiding bias toward the other of said two remanent states when driving said second core, and means to apply to said first core an aiding bias toward the other of said two remanent states when driving said third core.

References Cited in the file of this patent

UNITED STATES PATENTS

| | | |
|---|---|---|
| 2,803,812 | Rajchman et al. | Aug. 20, 1957 |
| 2,889,542 | Goldner et al. | June 2, 1959 |
| 2,918,664 | Bauer | Dec. 22, 1959 |
| 2,935,739 | Crane | May 3, 1960 |
| 3,004,245 | Crane et al. | Oct. 10, 1961 |